United States Patent
Zhang (10) Patent No.: US 10,663,922 B2
(45) Date of Patent: May 26, 2020

(54) IMAGE DISPLAY SYSTEM AND IMAGE DISPLAY METHOD

(71) Applicant: BOE Technology Group Co., Ltd., Beijing (CN)

(72) Inventor: Yuxin Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 164 days.

(21) Appl. No.: 15/538,310

(22) PCT Filed: Jan. 3, 2017

(86) PCT No.: PCT/CN2017/000014
§ 371 (c)(1),
(2) Date: Jun. 21, 2017

(87) PCT Pub. No.: WO2017/177720
PCT Pub. Date: Oct. 19, 2017

(65) Prior Publication Data
US 2018/0203413 A1    Jul. 19, 2018

(30) Foreign Application Priority Data
Apr. 14, 2016  (CN) .......................... 2016 1 0232300

(51) Int. Cl.
*G03H 1/08*    (2006.01)
*G03H 1/04*    (2006.01)
(Continued)

(52) U.S. Cl.
CPC ............ *G03H 1/08* (2013.01); *G03H 1/0443* (2013.01); *G03H 1/2202* (2013.01);
(Continued)

(58) Field of Classification Search
CPC ................................................ G03H 2222/42
See application file for complete search history.

(56) References Cited

U.S. PATENT DOCUMENTS 5,132,811 A * 7/1992 Iwaki ...................... G03H 1/16
  348/40
5,381,249 A * 1/1995 Burney .................... G03H 1/00
  348/40
(Continued)

FOREIGN PATENT DOCUMENTS

CA    2727902 A1    7/2012
CN    1227635 A     9/1999
(Continued)

OTHER PUBLICATIONS

Mar. 1, 2017—(WO) International Search Report and Written Opinion Appn PCT/CN2017/000014 with English Tran.
(Continued)

*Primary Examiner* — Derek S. Chapel
(74) *Attorney, Agent, or Firm* — Banner & Witcoff, Ltd.

(57) ABSTRACT

An image display system is provided. The image display system includes: at least one holographic image acquiring device each configured to obtain holographic image information of a scene; an image synthesis device configured to generate holographic image synthesis information based on at least a part of the holographic image information obtained by the at least one holographic image acquiring device; and an image reconstruction device configured to reconstruct a holographic synthetic image in accordance with the holographic image synthesis information. The image display system can synthesize holographic image information to combine several holographic three-dimensional display scenes into one holographic three-dimensional scene, so that the user can perceive display effects almost the same as the real scenes, improving user experience. An image display method is also provided.

20 Claims, 3 Drawing Sheets

(51) Int. Cl.
  *G03H 1/22* (2006.01)
  *G03H 1/00* (2006.01)
  *G03H 1/02* (2006.01)
  *G03H 1/26* (2006.01)

(52) U.S. Cl.
  CPC .......... *G03H 1/2294* (2013.01); *G03H 1/265* (2013.01); *G03H 2001/0088* (2013.01); *G03H 2001/0216* (2013.01); *G03H 2001/0445* (2013.01); *G03H 2001/0452* (2013.01); *G03H 2001/221* (2013.01); *G03H 2001/2244* (2013.01); *G03H 2222/16* (2013.01); *G03H 2260/35* (2013.01); *G03H 2260/54* (2013.01)

(56) References Cited

U.S. PATENT DOCUMENTS

| | | | | |
|---|---|---|---|---|
| 5,796,498 | A * | 8/1998 | French | G03H 1/0005 359/24 |
| 7,672,209 | B2 * | 3/2010 | Tateishi | G11B 7/0065 369/103 |
| 7,738,151 | B2 * | 6/2010 | Garner | G03H 1/02 359/32 |
| 8,208,186 | B2 * | 6/2012 | Yasuda | G03H 1/22 359/32 |
| 2002/0122024 | A1 | 9/2002 | Roggatz | |
| 2004/0179252 | A1 | 9/2004 | Tsukagoshi | |
| 2012/0002956 | A1 | 1/2012 | McDowall | |
| 2013/0148183 | A1 | 6/2013 | Dallas et al. | |
| 2014/0132710 | A1 * | 5/2014 | Yamaichi | G03H 1/0891 348/40 |
| 2015/0098066 | A1 | 4/2015 | Jurbergs | |
| 2015/0213645 | A1 | 7/2015 | Siebarth et al. | |
| 2015/0378307 | A1 * | 12/2015 | Zheng | G03H 1/2286 359/3 |
| 2018/0203413 | A1 | 7/2018 | Zhang | |
| 2018/0206723 | A1 * | 7/2018 | Zhang | A61B 34/35 |

FOREIGN PATENT DOCUMENTS

| | | |
|---|---|---|
| CN | 1570779 A | 1/2005 |
| CN | 101566823 A | 10/2009 |
| CN | 102129211 A | 7/2011 |
| CN | 102770087 A | 11/2012 |
| CN | 102967367 A | 3/2013 |
| CN | 10334-4416 A | 10/2013 |
| CN | 103365196 A | 10/2013 |
| CN | 203241352 U | 10/2013 |
| CN | 103425034 A | 12/2013 |
| CN | 103941568 A | 7/2014 |
| CN | 103959179 A | 7/2014 |
| CN | 104783821 A | 7/2015 |
| CN | 105444886 A | 3/2016 |
| CN | 105445925 A | 3/2016 |
| CN | 105739281 A | 7/2016 |
| CN | 105898217 A | 8/2016 |
| EP | 2477569 A2 | 7/2012 |
| EP | 2769270 A1 | 8/2014 |
| WO | 2013080883 A1 | 6/2013 |
| WO | 2015007034 A1 | 1/2015 |

OTHER PUBLICATIONS

Nov. 27, 2017—(CN) First Office Action Appn 201610232300.1 with English Tran.
May 15, 2019—U.S. First Office Action U.S. Appl. No. 15/539,787.
Mar. 29, 2017—(WO) International Search Report and Written Opinion Appn PCT/CN2017/000017 with English Tran.
Jun. 8, 2018—(CN) First Office Action Appn 201610232400.4 with English Translation.
Apr. 11, 2019—U.S. Office Action U.S. Appl. No. 15/538,310.
Oct. 31, 2018—(CN) Second Office Action Appn 201610232400.4 with English Translation.

* cited by examiner

IMAGE DISPLAY SYSTEM AND IMAGE DISPLAY METHOD

The application is a U.S. National Phase Entry of International Application No. PCT/CN2017/000014 filed on Jan. 3, 2017, designating the United States of America and claiming priority to Chinese Patent Application No. 201610232300.1 filed on Apr. 14, 2016. The present application claims priority to and the benefit of the above-identified applications and the above-identified applications are incorporated by reference herein in their entirety.

TECHNICAL FIELD

At least one embodiment of the present disclosure involves an image display system and an image display method.

BACKGROUND

In recent years, many commercial shows of holographic display are implemented in a quasi-holographic way, in which a projector or any other means is used to form an image of a light source after 45-degree refraction onto a phantom imaging film (e.g. a holographic film).

Essentially different from a pure holographic way, this quasi-holographic way is implemented with a film having both relatively high transmissivity and relatively high reflectivity. Although such a quasi-holographic display technology allows a viewer to get a feeling of some spatial effect, it is not really holographic, because when viewing the virtual images from the imaging in some angles, the viewer still cannot perceive holographic images having the same display effect as real scenes.

SUMMARY

According to one aspect of this disclosure, an image display system is provided, comprising: at least one holographic image acquiring device each configured to obtain holographic image information of a scene; an image synthesis device configured to generate holographic image synthesis information based on at least a part of the holographic image information obtained by the at least one holographic image acquiring device; and an image reconstruction device configured to reconstruct a holographic synthetic image in accordance with the holographic image synthesis information.

For example, a holographic image acquiring device comprises a light source assembly, an optical assembly and an image acquiring device.

For example, the light source assembly is configured to emit a first light beam and a second light beam that irradiates the scene, the second light beam is guided to the scene by the optical assembly, the light exiting from the scene impinges on the image acquiring device after interfering with the first light beam and the image acquiring device converts the interference information formed by the interference into electrical signals to get holographic image information and send holographic image information to the image synthesis device.

For example, the light source assembly comprises a first laser, the optical assembly comprises a light splitting device, which splits the light emitted by the first laser into a first light beam and a second light beam.

For example, the holographic image acquiring device further comprises a holographic storage material; the light source assembly is configured to emit a first light beam and a second light beam that irradiates the scene, the second light beam is guided to the scene by the optical assembly, and the light exiting from the scene impinges on the holographic storage material after interfering with the first light beam to store the holographic image information in the holographic storage material; and the light source assembly is further configured to emit a third light beam to irradiate the holographic storage material, so that an imaging beam exiting from the holographic storage material is generated and irradiates the image acquiring device, which then generates electrical signals to get holographic image information and send holographic image information to the image synthesis device.

For example, the light source assembly comprises a first laser and the optical assembly comprises a light splitting device, which splits a primary light emitted by the first laser into a first light beam, a second light beam and a third light beam.

For example, the light source assembly comprises a first laser and a second laser as well as a light splitting device; the light splitting device splits the primary light beam emitted from the first laser into a first light beam and a second light beam, and the second laser emits a third light beam.

For example, a holographic image acquiring device comprises a light source assembly, an image acquiring device and a holographic storage material having optical images of the scene stored therein; and the light source assembly emits a fourth light beam that irradiates the holographic storage material to generate an imaging beam exiting from the holographic storage material and the imaging beam impinges on the image acquiring device to make it generate electrical signals so as to get and send holographic image information to the image synthesis device.

For example, the holographic storage material comprises a photorefractive crystal, a photo-chromic material or a photopolymer.

For example, the holographic storage material is disposed on a movable device, which is configured to orientate different parts of the holographic storage material to the light beam to impinge thereon.

For example, the movable device is a rotatable table.

For example, further comprising an editing data input device configured for inputting editing data, wherein the image synthesis device is further configured to utilize the editing data to edit at least a part of the holographic image information, so that the holographic image synthesis information is generated.

For example, the image acquiring device comprises a CCD or CMOS imaging device.

For example, the image reconstruction device comprises: a light source configured to emit a reconstructing beam; a spatial light modulator configured to receive the holographic image synthesis information and convert it into optical signals with irradiation of the reconstructing beam; and an imaging device configured to present the optical signals as a holographic synthetic image.

For example, the light source comprises a laser.

For example, the spatial light modulator comprises a liquid crystal light valve, a MEMS spatial light modulator, a digital micro-mirror device or an acousto-optic modulator.

For example, the holographic image acquiring device, the image synthesis device and the image reconstruction device are connected through networks.

According to at least one embodiment of this disclosure, an image display method is provided, comprising: obtaining holographic image information of at least one scene; generating holographic image synthesis information based on at least a part of the holographic image information of at least one scene; and reconstructing a holographic synthetic image in accordance with the holographic image synthesis information.

For example, the step of obtaining holographic image information of at least one scene comprises: emitting a first light beam and a second light beam that irradiates the scene, guiding the second light beam to the scene, irradiating one image acquiring device with the light exiting from the scene and having interfered with the first light beam and converting the interference information formed by the interference into electrical signals by the image acquiring device to get the holographic image information.

For example, the step of obtaining holographic image information of at least one scene comprises: emitting a first light beam and a second light beam that irradiates the scene, guiding the second light beam to the scene and irradiating the holographic storage material with the light reflected by and exiting from the scene and having interfered with the first light beam to store the holographic image information in the holographic storage material; and emitting a third light beam to irradiate the holographic storage material so as to generate an imaging beam exiting from the holographic storage material and irradiating one image acquiring device with the imaging beam to make it generate electrical signals and thus obtain the holographic image information.

For example, the step of obtaining holographic image information of at least one scene comprises: pre-storing optical images of the scene(s) in a holographic storage material; and emitting a fourth light beam to irradiate the holographic storage material so as to generate an imaging beam exiting from the holographic storage material and irradiating one image acquiring device with the imaging beam to make it generate electrical signals and thus get the holographic image information.

For example, the holographic storage material is disposed on a movable device, which is configured to orientate different parts of the holographic storage material to the light beam to impinge thereon.

For example, the movable device is a rotatable table.

For example, before the step of generating holographic image synthesis information based on at least a part of the holographic image information of at least one scene the method further comprises receiving input editing data; and the step of generating holographic image synthesis information based on at least a part of the holographic image information of at least one scene comprises: utilizing the editing data to edit at least a part of the holographic image information so as to generate the holographic image synthesis information.

For example, the step of reconstructing a holographic synthetic image in accordance with the holographic image synthesis information comprises: emitting a reconstructing beam; receiving the holographic image synthesis information; converting the holographic image synthesis information into optical signals with irradiation of the reconstructing beam; and presenting the optical signals as a holographic synthetic image.

In embodiments of the present disclosure, holographic image information can be synthesized to combine several holographic three-dimensional display scenes into one holographic three-dimensional scene, so that holographic three-dimensional images from different geographical locations or data sources are synthesized into one and the same scene to make the user perceive display effects almost the same as real scenes and thus improve user experience.

BRIEF DESCRIPTION OF DRAWINGS

In order to clearly illustrate the technical solution of embodiments of the present disclosure, accompanying drawings of the embodiments will be briefly described in the following; it is obvious that the described drawings are only related to some embodiments of the present disclosure and thus are not limitative of the present disclosure.

REFERENCE NUMERALS 100 image display system, 110 holographic image acquiring device, 111 light source assembly, 1111 first laser, 1112 second laser, 112 optical assembly, 1121 first slit, 1122 light splitting device, 1123 filter, 1124 first beam expanding and collimating device, 1125 reflecting mirror, 1126 first lens, 1127 second slit, 1128 second beam expanding and collimating device, 1129 second lens, 113 holographic storage material, 114 image acquiring device, 115 movable device, 120 image synthesis device, 130 image reconstruction device, 131 light source, 1311 third laser, 132 spatial light modulator, 133 imaging device, 1331 third slit, 1332 third beam expanding and collimating device, 140 editing data input device

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
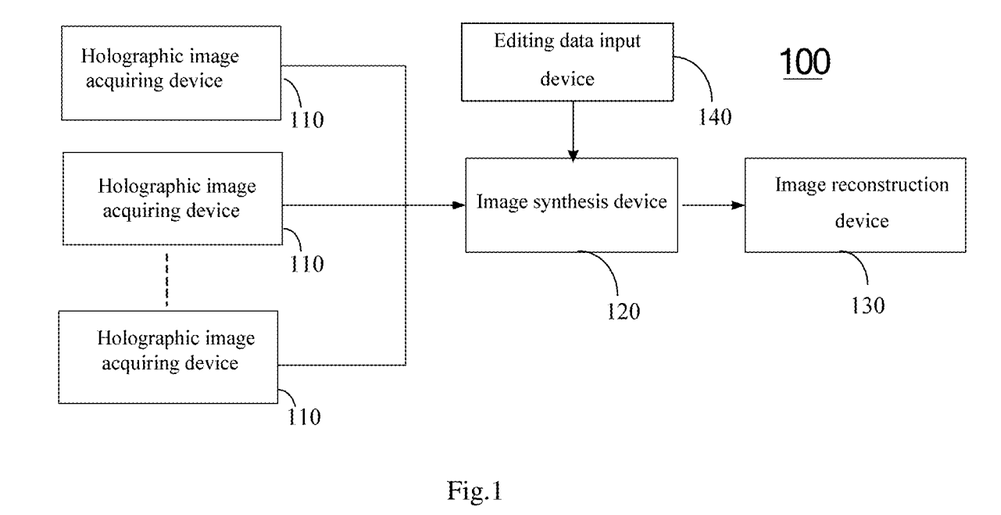
FIG. 1 shows a structure diagram of an image display system in accordance with an embodiment of the present disclosure.

In accordance with an embodiment of the present disclosure, an image display system is provided. FIG. 1 shows a structure diagram of an image display system in accordance with an embodiment of the present disclosure. As shown in FIG. 1, the image display system 100 includes at least one holographic image acquiring device 110, an image synthesis device 120 and an image reconstruction device 130.

In accordance with an example of the present disclosure, there may be disposed one or more holographic image acquiring devices 110, each of which is configured to acquire holographic image information of a scene (for example, a stage etc.). The image synthesis device 120 is configured to generate holographic image synthesis information based on the holographic image information obtained by the at least one holographic image acquiring device 110. The image reconstruction device 130 is configured to reconstruct a holographic synthetic image in accordance with the hologram image synthesis information.

Figure 2:
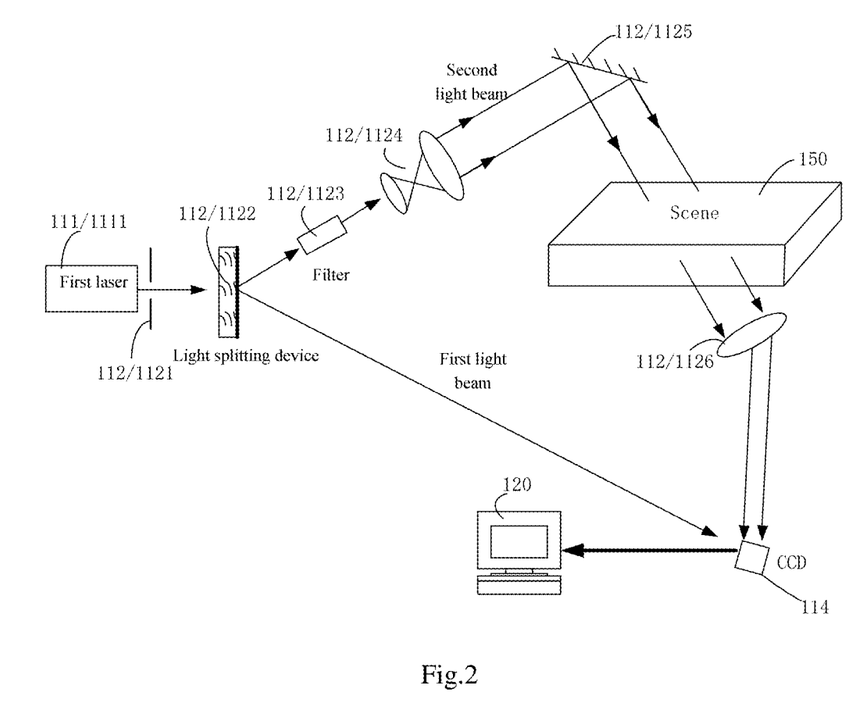
FIG. 2 shows a structure diagram of a first example of a holographic image acquiring device in accordance with an embodiment of the present disclosure.

The holographic image acquiring device 110 is used to acquire holographic image information of a scene. If there are multiple holographic image acquiring devices 110, each of them can acquire holographic image information of a scene. FIG. 2 shows a first example of the holographic image acquiring device 110 in accordance with the embodiment of the present disclosure. As shown in FIG. 2, in this example, the holographic image acquiring device 110 may include a light source assembly 111, an optical assembly 112 and an image acquiring device 114. The light source assembly 111 is configured to emit a first light beam and a second light beam that illuminates the scene. The second light beam is guided to the scene by the optical assembly and the light exiting from the scene is incident on the image acquiring device 114 after interfering with the first light beam. The image acquiring device 114 converts the interference information generated from the interference into electrical signals to get holographic image information and send holographic image information to the image synthesis device 120.

As shown in FIG. 2, as a light source enabling holographic recording, the light source assembly 111 is used to emit light rays, such as, laser, LED light, infrared or near infrared light, white light or the like. For example, the light source assembly 111 may be implemented by one or more lasers, one or more infrared generators or any combination thereof. In addition, the light source assembly may be any other light source allowing holographic recording, for example, a white light source etc. Optionally, the light source assembly 111 may be implemented by a tunable near infrared fiber laser or an infrared light emitting tube. The infrared light emitting tube is a luminous body composed by a matrix of infrared light emitting diodes. An infrared light emitting diode has a PN node made of a material having high infrared radiation efficiency. If the PN node is forward biased, current will be injected into the PN node to excite emitting of infrared light.

In accordance with an example of the present disclosure, the light source assembly 111 may emit a first light beam and a second light beam. Optionally, the light source assembly 111 includes a first laser 1111 emitting a primary light beam, which are split into a first light beam and a second light beam by a light splitting device with the first light beam being an object beam and the second light beam being a reference beam. The second light beam irradiates the scene, such as, a stage scene, a scene containing objects, a scene containing persons, etc. The second light beam may irradiate the scene directly or be guided to the scene by the optical assembly 112. In this way, the light exiting from the scene is incident on the image acquiring device 114 after interfering with the first light beam; the image acquiring device 114 converts the interference information into electrical signals to get holographic image information, which can be sent, by the image acquiring device 114, to a nearby image synthesis device 120 directly through a data line or to a remote image synthesis device 120 through networks.

The optical assembly 112 is used to guide, split, filter or otherwise process light in the holographic image acquiring device. For example, as shown in FIG. 2, the optical assembly 112 may include a light splitting device 1122 (e.g. an optical splitter) used to split the light from the first laser 1111 in the light source assembly 111 into a first light beam and a second light beam.

Optionally, the optical assembly 112 may further include a filter for filtering of light rays if light rays in a certain band are to be filtered from the first light beam. For example, the filter 1123 in FIG. 2 is used to filter the second light beam.

Optionally, in order to change the diameters and divergence angles of the light beams, the optical assembly 112 may further include a beam expanding device. In order for light to be coupled into the receiving device as efficiently as possible, the optical assembly 112 may further include a collimating device. For example, the first beam expanding and collimating device 1124 in FIG. 2 has the functionality of both beam expanding and beam collimating.

Optionally, in order to guide the light beam to the scene after being expanded or converged by adjusting the optical path, the optical assembly 112 may further include one or more lens, reflecting mirrors or plane mirrors or any combination thereof as required by direction guiding in the optical path. For example, the reflecting mirror 1125 and the first lens 1126 shown in FIG. 2 are used to reflect and converge light respectively.

Optionally, in order to determine the spectral bandwidth and the intensity of the exiting light beam, the optical assembly 112 may further use a slit at the emitting end of the light source assembly 111 to set an appropriate gap. Optionally, the slit may have the maximum width of 2 millimeter (mm). As a slit is a principle component in a spectroscope, a spectroscope may be used to design a slit applicable to the light source assembly 111. For example, as shown in FIG. 2, a first slit 1121 is disposed at the emitting end of the first laser 1111.

It is to be noted that, in optical paths of the first and second light beams, the above-mentioned optical assembly 112 may be added or reduced, for example, with respect to its lens set, reflecting mirrors or other optical elements based on requirements in a practical application so as to, for example, adjust directions or divergence angles of light rays.

The image acquiring device 114 is used to convert the interference information formed by the interference into electrical signals to get and send holographic image information to the image synthesis device 120. For example, the image acquiring device 114 may be implemented by a Charge Coupled Device (CCD) or Complementary Metal-Oxide Semiconductor (CMOS) imaging device. Both a CCD and CMOS can sense light and convert optical signals into digital signals.

As shown in FIG. 2, in accordance with an example of the present disclosure, the holographic image acquiring device 110 may generate an image in a way as follows. The light source assembly 111 emits a first light beam and a second light beam that illuminates the scene 150. The second light beam is guided to the scene 150 by the optical assembly 112 and illuminates the scene 150 and the light reflected from the scene 150 impinges on the image acquiring device 114 after interfering with the first light beam. The image acquiring device 114 converts the interference information into electrical signals so as to obtain holographic image information of the scene. Thereafter, the image acquiring device 114 may send the data to the image synthesis device 120.

In accordance with another example of the present disclosure, the holographic image acquiring device 110 may generate an image in a way as follows. As shown in FIG. 2, the light emitted by the first laser 1111 is split into a first light beam and a second light beam by the light splitting device 1122 after passing through the first slit 1121. The first light beam may act as a reference beam and the second light beam may act as an object beam. The second light beam is filtered by the filter 1123, expanded and collimated by the first beam expanding and collimating device 1124 and then reflected, by the first reflecting mirror 1125, to the scene 150 where it experiences diffuse reflection. Thereafter the light rays reflected from the scene 150 are converged by the first lens 1126 and incident on the image acquiring device 114, which converts the interference information into electrical signals so as to obtain holographic image information of the scene. Then the image acquiring device 114 may send the data to the image synthesis device 120.

Figure 3:
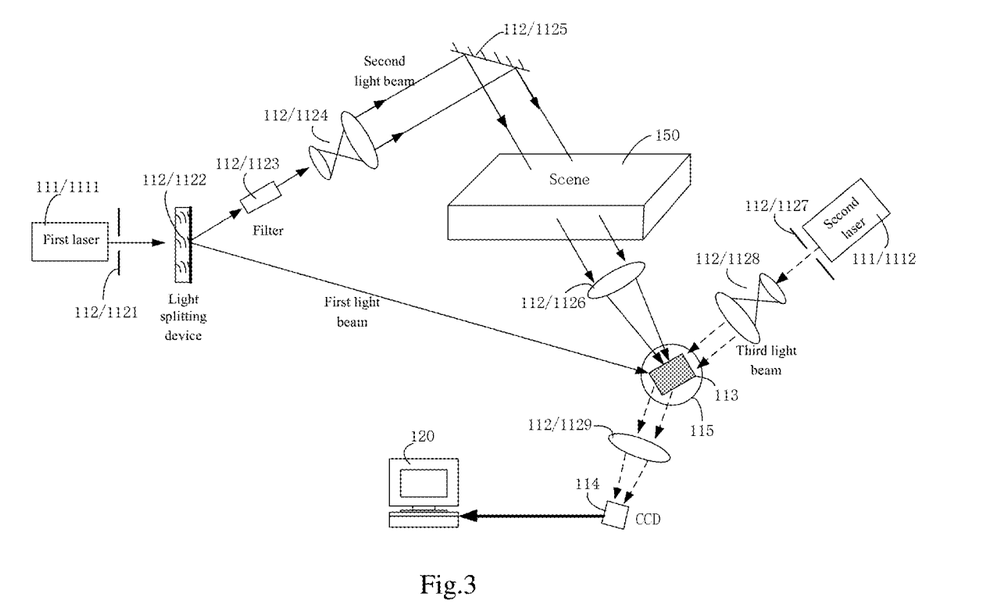
FIG. 3 shows a structure diagram of a second example of a holographic image acquiring device in accordance with an embodiment of the present disclosure.

FIG. 3 shows a second example of the holographic image acquiring device 110 in the embodiment of the present disclosure. As shown in FIG. 3, in this example, the holographic image acquiring device 110 may includes a light source assembly 111, an optical assembly 112, a holographic storage material 113 and an image acquiring device 114.

As shown in FIG. 3, as a light source enabling holographic recording, the light source assembly 111 is used to emit light rays, such as, laser, LED light, infrared or near infrared light, whit light or the like. For example, the light source assembly 111 may be implemented by one or more lasers, one or more infrared generators or any combination thereof. In addition, the light source assembly may be any other light source allowing holographic recording, for example, a white light source etc. Optionally, the light source assembly 111 may be implemented by a tunable near infrared fiber laser or an infrared light emitting tube. The infrared light emitting tube is a luminous body composed by a matrix of light emitting diodes. An infrared light emitting diode has a PN node made of a material having high infrared radiation efficiency. If the PN node is forward biased, current will be injected into the PN node to excite emitting of infrared light.

In accordance with an example of the present disclosure, the light source assembly 111 may emit a first light beam and a second light beam. The second light beam illuminates the scene. The second light beam may irradiate the scene directly or be guided to the scene by the optical assembly 112. In this way, the light reflected from the scene impinges on the holographic storage material 113 after interfering with the first light beam to store the holographic image information of the scene into the holographic storage material 113.

In accordance with another example of the present disclosure, in addition to the first and second light beams, the light source assembly 111 may also emit a third light beam. The third light beam is used to irradiate the holographic storage material and thereby an imaging beam will be generated and exit from the holographic storage material. The imaging beam impinges on the image acquiring device 114 to convert optical signals into electrical signals.

Alternatively, the light source assembly 111 includes a first laser 1111 and a second laser 1112. The first laser 1111 is used to emit the above-mentioned first and second light beams, while the second laser 1112 is used to emit the above-mentioned third light beam. For example, the light beam emitted by the first laser 1111 is split into the first light beam and the second light beam. Of course, the light source assembly 111 may optionally include three lasers emitting the first, second and third light beams respectively.

Alternatively, the light source assembly may only include the first laser 1111, and the primary light beam emitted from the first laser 1111 is split into a first light beam, a second light beam and a third light beam.

The optical assembly 112 is used to guide, split, filter or otherwise process light in a holographic medical apparatus. For example, as shown in FIG. 3, the optical assembly 112 may include a light splitting device 1122 (e.g. an optical splitter) used to split the light from the first laser 1111 in the light source assembly 111 into the first light beam and the second light beam.

Optionally, the optical assembly 112 may further include a filter for filtering of light rays if light rays in a certain band are to be filtered from the first light beam. For example, the filter 1123 in FIG. 2 is used to filter the first light beam.

Optionally, in order to change the diameters and divergence angles of the light beams, the optical assembly 112 may further include a beam expanding device. In order for light to be coupled into the receiving device as efficiently as possible, the optical assembly 112 may further include a collimating device. For example, the first beam expanding and collimating device 1124 and the second beam expanding and collimating device 1128 in FIG. 3 have the functionality of both beam expanding and beam collimating.

Optionally, in order to guide the light beam to the scene after being expanded or converged by adjusting the optical path, the optical assembly 112 may further include one or more lens, reflecting mirrors or plane mirrors or any combination thereof as required by direction guiding in the optical path. For example, the reflecting mirror 1125 and the first and second lenses 1126, 1129 shown in FIG. 3 are used to reflect or converge light respectively.

Optionally, in order to determine the spectral bandwidth and the intensity of the exiting light beam, the optical assembly 112 may further use a slit at the emitting end of the light source assembly 111 to set an appropriate gap. Optionally, the slit may have the maximum width of 2 millimeter (mm). As a slit is a principle component in a spectroscope, a spectroscope may be used to design a slit applicable to the light source assembly 111. For example, as shown in FIG. 3, a first slit 1121 and a second slit 1127 are respectively disposed at the emitting ends of the first laser 1111 and the second laser 1112.

It is to be noted that in the optical paths of the first, second and third light beams, the above-mentioned optical assembly 112 may be added or reduced, for example, with respect to its lens set, reflecting mirrors or other optical elements based on requirements in a practical application so as to, for example, adjust directions or divergence angles of light rays.

The holographic storage material 113 is used to store optical information. As shown in FIG. 3, in an example of the present disclosure, the holographic storage material 113 stores interference information of the first and second light beams. The holographic storage material 113 may include photorefractive crystal, a photo-chromic material, photopolymer or the like. The photorefractive crystal stores holograms utilizing the photorefractive effect, i.e. the effect of the local refractive index of photorefractive crystal varying in proportion to the intensity of incident light when irradiated by light of non-uniform intensity. Photorefractive crystal has advantages such as a large dynamic range, good storage persistence, capability of being fixed, having mature growth process and the like. For example, photorefractive crystal may be iron-doped lithium niobate crystal (KiNbO3:Fe), strontium barium niobate (SNB), barium titanate (BaTiO3) etc., or organic photopolymer, such as PMMA:DTNB:C60, PQ/PMMA etc.

The image acquiring device 114 is used to generate data corresponding to the holographic image information, for example, to convert light rays into electrical signals. As shown in FIG. 3, in an example of the embodiment of the present disclosure, the image acquiring device 114 converts the third light beam transmitting through the holographic storage material 113 into electrical information. For example, the image acquiring device 114 may be implemented by a Charge Coupled Device (CCD) or Complementary Metal-Oxide Semiconductor (CMOS) imaging device. Both a CCD and CMOS can sense light and convert optical signals into digital signals.

As shown in FIG. 3, in accordance with an example of the present disclosure, the holographic image acquiring device 110 may generate an image in a way as follows. The light source assembly 111 emits a first light beam and a second light beam that illuminates the scene 150. The second light beam is guided to the scene 150 by the optical assembly 112 and illuminates the scene 150 and the light reflected from the scene 150 impinges on the holographic storage material 113 after interfering with the first light beam so as to store holographic image information therein.

In addition, the light source assembly 111 may also emit a third light beam, which impinges on the holographic storage material 113 to generate an imaging beam exiting therefrom. The imaging beam impinges on the image acquiring device 114, which will generate electrical signal data corresponding to the holographic image information and then sends the data to the image synthesis device.

In accordance with another example of the present disclosure, the holographic image acquiring device 110 may generate an image in a way as follows. As shown in FIG. 3, the light emitted by the first laser 1111 is split into a first light beam and a second light beam by the light splitting device 1122 after passing through the first slit 1121. The first light beam may act as a reference beam and the second light beam may act as an object beam. The second light beam is filtered by the filter 1123, expanded and collimated by the first beam expanding and collimating device 1124, and then reflected, by the first reflecting mirror 1125, to the scene 150, where it experiences diffuse reflection. Thereafter, the light rays reflected from the scene 150 are converged by passing through the first lens 1126 and then impinge on the holographic storage material 113. At the same time, the first light beam impinges on the holographic storage material 113 directly or is guided to the holographic storage material 113. The first light beam is superimposed on and interferes with the second light beam, with the interference information being stored into the holographic storage material 113.

In addition, in order for the optical information in the holographic storage material 113 to be read out, the second laser 1112 is used to emit light rays that are expanded and collimated by passing through the second slit 1127 and the second beam expanding and collimating device 1128 and are directed to the holographic storage material 113. The light rays exiting from the holographic storage material 113 pass through the second lens 1129 and impinge on the image acquiring device 114, which then converts the information stored in the holographic storage material 113 into electrical signals to be read out.

In order to reduce interference between multiple stored holograms as much as possible, it is enabled to record and read data in real time, and every time a holographic image is written in the holographic storage material 113, the holographic storage material 113 is rotated by an angle and then the next holographic image is written therein. In accordance with an example of the present disclosure, the holographic storage material 113 may be disposed on a movable device 115. When the image display system 100 is in operation, the movable device 115 can move the holographic storage material 113 to make the information of the light reflected from the scene 150 and having interfered with the first light beam recorded therein at different angles and positions and the holographic storage material 113 is irradiated by the third light beam to enable the data to be read out in real time.

Alternatively, the position at which the third light beam is emitted may change around the holographic storage material 113. For example, the second laser 1112 is disposed on a movable optical platform, which can drive the second laser 1112 to move round the holographic storage material 113, so that the emitting position of the third light beam may change around the holographic storage material 113.

Optionally, the movable device 115 is a rotatable table. For example, the rotatable table may be a single-axis rotatable table, a two-axis rotatable table, a three-axis rotatable table or a rotatable table with more axes. A multi-axis rotatable table is beneficial to improving the accuracy of the orientation of the rotatable table and the holographic storage material 113 disposed thereon and to storage and reading of holographic images.

Figure 4:
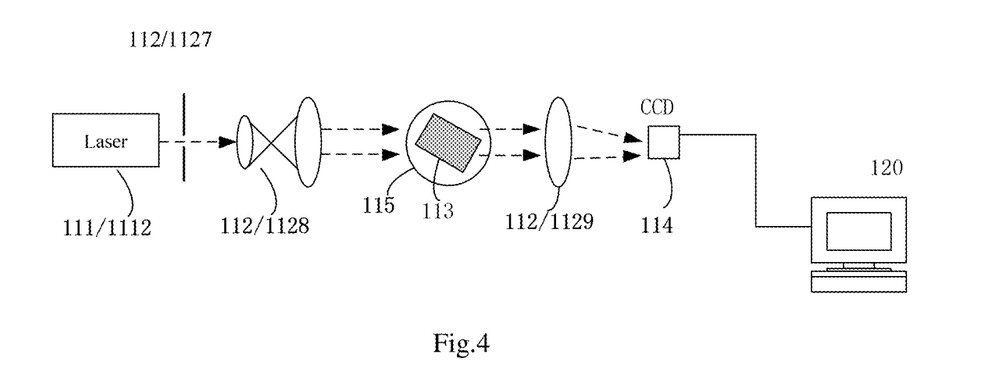
FIG. 4 shows a structure diagram of the a third example of a holographic image acquiring device in accordance with an embodiment of the present disclosure.

FIG. 4 shows a third example of the holographic image acquiring device 110 in the embodiment of the present disclosure. As shown in FIG. 4, in this example, the holographic image acquiring device 110 may include a light source assembly 111, a holographic storage material 113 and an image acquiring device 114. The holographic storage material 113 has optical images pre-stored therein and the light source assembly 111 emits a fourth light beam, which irradiates the holographic storage material 113 to generate an imaging beam exiting therefrom. The imaging beam impinges on the image acquiring device 114, making it generate electrical signals so as to get and send holographic image information to the image synthesis device 120.

As shown in FIG. 4, as a light source enabling holographic recording, the light source assembly 111 is used to emit light rays, such as, laser, LED light, infrared or near infrared light, white light or the like. For example, the light source assembly 111 may be implemented by one or more lasers, one or more infrared generators or any combination thereof. For example, in FIG. 4, the light source assembly 111 is implemented by the second laser 1112. In addition, the light source assembly may be any other light source allowing holographic recording, for example, a white light source etc. Optionally, the light source assembly 111 may be implemented by a tunable near infrared fiber laser or an infrared light emitting tube. The infrared light emitting tube is a luminous body composed by a matrix of light emitting diodes. An infrared light emitting diode has a PN node made of a material having high infrared radiation efficiency. If the PN node is forward biased, current will be injected into the PN node to excite emitting of infrared light.

Optionally, in this example, the holographic image acquiring device 110 may further include an optical assembly 112. The optical assembly 112 is used to guide, split, filter or otherwise process light in the holographic image acquiring device 110. Optionally, as shown in FIG. 4, in order to change the diameters and divergence angles of the light beams, the optical assembly 112 may further include a beam expanding device. In order for light to be coupled into the receiving device as efficiently as possible, the optical assembly 112 may further include a collimating device. For example, the second beam expanding and collimating device 1128 in FIG. 4 has the functionality of both beam expanding and beam collimating.

Optionally, in order to guide the light beam to the scene after being expanded or converged by adjusting the optical path, the optical assembly 112 may further include one or more lens, reflecting mirrors or plane mirrors or any combination thereof as required by direction guiding in the optical path. For example, the second lens 1129 in FIG. 4 is used to converge light.

Optionally, in order to determine the spectral bandwidth and the intensity of the exiting light beam, the optical assembly 112 may further use a slit at the emitting end of the light source assembly 111 to set an appropriate gap. The slit may have the maximum width of 2 millimeter (mm). As a slit is a principle component in a spectroscope, a spectroscope may be used to design a slit applicable to the light source assembly 111. For example, as shown in FIG. 4, a second slit 1127 is disposed at the emitting end of the second laser 1112.

It is to be noted that, in optical paths in the present example, the above-mentioned optical assembly 112 may be added or reduced, for example, with respect to its lens set, reflecting mirrors or other optical elements based on requirements in practical application so as to, for example, adjust directions or divergence angles of light rays.

The holographic storage material 113 has optical information of scenes pre-stored therein. As shown in FIG. 4, the holographic storage material 113 may include photorefractive crystal, a photo-chromic material, photopolymer or the like. The photorefractive crystal stores holograms utilizing the photorefractive effect, i.e. the effect of the local refractive index of photorefractive crystal varying in proportion to the intensity of incident light when irradiated by light of non-uniform intensity. Photorefractive crystal has advantages such as a large dynamic range, good storage persistence, capability of being fixed and having mature growth process and the like. For example, photorefractive crystal may be iron-doped lithium niobate crystal (KiNbO3: Fe), strontium barium niobate (SNB), barium titanate (BaTiO3) etc., or organic photopolymer, such as PMMA:DTNB:C60, PQ/PMMA etc.

The image acquiring device 114 is used to generate data corresponding to the holographic image information, for example, to convert light rays into electrical signals. As shown in FIG. 4, the image acquiring device 114 converts the light beam exiting from the holographic storage material 113 into electrical information. For example, the image acquiring device 114 may be implemented by a Charge Coupled Device (CCD) or Complementary Metal-Oxide Semiconductor (CMOS) imaging device. Both a CCD and CMOS can sense light and convert optical signals into digital signals.

As shown in FIG. 4, in accordance with an example of the present disclosure, the holographic image acquiring device 110 may generate an image in a way as follows. The light source assembly 111 emits a fourth light beam, which irradiates the holographic storage material 113 to generate an imaging beam exiting from the holographic storage material. The imaging beam impinges on the image acquiring device 114, which generates electrical signal data corresponding to the holographic image information based on the imaging beam. Then the data are sent to the image synthesis device 120.

In accordance with another example of the present disclosure, the holographic image acquiring device 110 may obtain an image in a way as follows. As shown in FIG. 4, the second laser 1112 emits a fourth light beam that passes through the second slit 1127, is expanded and collimated by the second expanding and collimating device 1128 and then directed to the holographic storage material 113. The light rays exiting from the holographic storage material 113 pass through the second lens 1129 and impinge on the image acquiring device 114, which then converts optical signals into electrical signal data based on the incident light. Then the data are sent to the image synthesis device 120.

In order to reduce interference between multiple stored holograms as much as possible, it is enabled to record and read data in real time, and every time a holographic image is written in the holographic storage material 113, the holographic storage material 113 is rotated by an angle and then the next holographic image is written therein. In accordance with an example of the present disclosure, the holographic storage material 113 may be disposed on a movable device 115. When the image display system 100 is in operation, the movable device 115 can move the holographic storage material 113 to make the information of the light reflected from the scene 150 and having interfered with the first light beam recorded therein at different angles and positions and the fourth light beam irradiates the holographic storage material 113 to enable the data to be read out in real time.

Alternatively, the position at which the fourth light beam is emitted may change around the holographic storage material 113. For example, the second laser 1112 is disposed on a movable optical platform, which can drive the second laser 1112 to move round the holographic storage material 113, so that the emitting position of the fourth light beam may change around the holographic storage material 113.

Optionally, the movable device 115 is a rotatable table. For example, the rotatable table may be a single-axis rotatable table, a two-axis rotatable table, a three-axis rotatable table or a rotatable table with more axes. A multi-axis rotatable table is beneficial to improving the accuracy of the orientation of the rotatable table and the holographic storage material 113 disposed thereon and to storage and reading of holographic images.

The image synthesis device 120 is configured to generate holographic image synthesis information based on the holographic image information obtained by the at least one holographic image acquiring device 110. The image synthesis device 120 may be implemented in software, hardware or firmware. In accordance with an example of the present disclosure, when multiple holographic image acquiring devices 110 send their obtained holographic image information to the image synthesis device 120 respectively, the image synthesis device 120 receives the multiple pieces of holographic image information and synthesizes them into one image.

In an embodiment, the image display system may further include an editing data input device 140 configured for a user to input editing data. In this way, the image synthesis device 120 may also utilize the editing data to edit one or more received pieces of holographic image information, for example, to perform image segmentation, image recognition, image format conversion or other operations on the image information. Of course, it can be understood by those skilled in the art that the image synthesis device 120 may edit and synthesize the holographic image information it has received or only a part thereof. For example, the desired part is firstly obtained and extracted from the holographic image information and only the part is edited and synthesized so as to generate the holographic image synthesis information. When having generated the holographic image synthesis information, the image synthesis device 120 may send the information to the image reconstruction device 130 for reconstruction of a holographic image.

Figure 5:
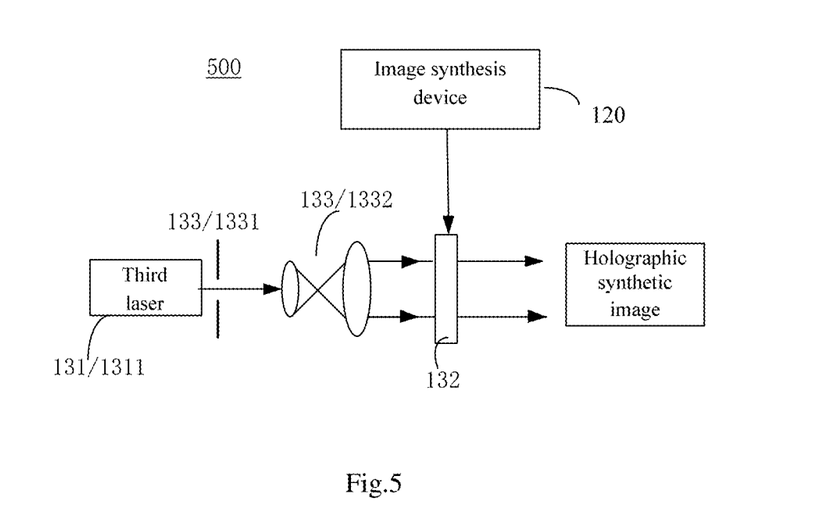
FIG. 5 shows a structure diagram of an image reconstruction device in accordance with an embodiment of the present disclosure.

The image reconstruction device 130 is configured to reconstruct a synthetic holographic image in accordance with the synthetic hologram image information, i.e. to convert the holographic image information into a holographic image viewable for human eyes. FIG. 5 shows a structure diagram of an image reconstruction device in an embodiment of the present disclosure. In an example of the present disclosure, the image reconstruction device 130 includes a light source 131, a spatial light modulator 132 and an imaging device 133.

The light source 131 is configured to emit a reconstruction beam. The light source 131 may be a laser, a LED light, an infrared generator or any other light source allowing holographic reconstruction, for example, a white light source etc. As shown in FIG. 5, the light source 131 is, for example, a third laser 1311.

The spatial light modulator 132 is configured to receive holographic image information and can convert the holographic image information into optical signals when irradiated by the reconstruction beam. For example, the spatial light modulator 132 may be a liquid crystal light valve or a MEMS (Micro-Electro-Mechanical System) spatial light modulator for holographic reconstruction, or may be a digital micro-mirror device (DMD), an acousto-optic modulator (AOM) or the like.

The imaging device 133 is configured to present the optical signals as a holographic image. The imaging device 133 may coordinate with the light source 131 and the spatial light modulator 132 through lens, reflecting mirrors or other optical elements to present the optical signals as a holographic image viewable for human eyes. For example, as shown in FIG. 5, the imaging device 133 may, for example, include a third slit 1331 and a third beam expanding and collimating device 1332. The slit 1331 may be implemented with the built-in functionality of a spectroscope and the third beam expanding and collimating device 1332 may be implemented by a beam expander and a collimator or their combination.

In accordance with an example of the present disclosure, in the holographic reconstruction device 130, the reconstructing beam emitted by the third laser 1311 passes the third slit 1331, expanded and collimated by the third beam expanding and collimating device 1332, and then impinges on the spatial light modulator 132 to reconstruct the image of a synthesized scene.

In accordance with an example of the present disclosure, the holographic image acquiring device 110, the image synthesis device 120 and the image reconstruction device 130 may included in one apparatus, or located at different geographical locations and connected through wired or wireless networks.

In this way, the image display system in the embodiment of the present disclosure may synthesize and reconstruct holographic images of different scenes into one scene image. Or three-dimensional images at different geographical locations or from different data sources may be synthesized into one and the same image. For example, the image display system in the embodiment of the present disclosure may be used to synthesize the scenes of evening parties in different cities in such a way that the viewers can watch them as if they were watching one evening party. The image display system in the present disclosure may also synthesize and reconstruct images of persons at different geographical locations into the scene of one site, for example, to make a teleconference look like an on-the-spot meeting, greatly improving user experience.

Figure 6:
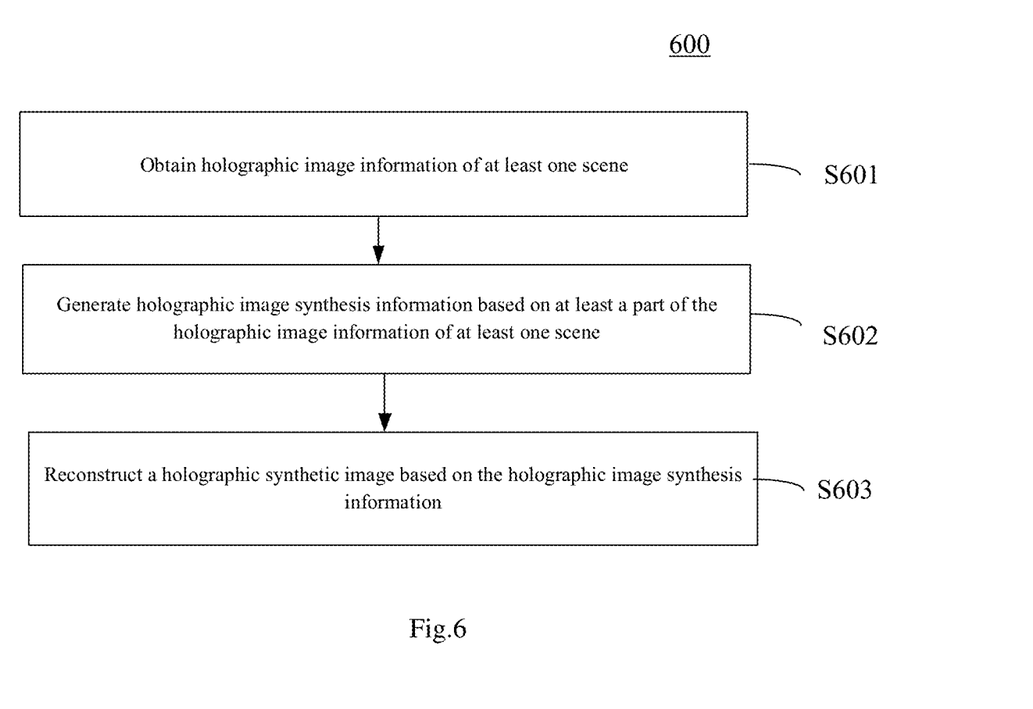
FIG. 6 shows a flowchart of a image display method in accordance with an embodiment of the present disclosure.

In accordance with another aspect of the present disclosure, an image display method is further provided. FIG. 6 shows an image display method 600 in accordance with an embodiment of the present disclosure. The image display method 600 corresponds to the image display system described above. As a result, for brevity of the specification, only brief description is provided hereafter and the image display system described above may be referred to for specific implementations. As shown in FIG. 6, the image display method 600 includes the following steps.

In step S601, holographic image information of at least one scene is obtained. In accordance with an example of the present disclosure, in a way to obtain holographic image information of a scene, a first light beam and a second light beam are emitted, the second light beam is guided to the scene, the light reflected from the scene impinges on an image acquiring device after interfering with the first light beam, and the image acquiring device converts the interference information generated by the interference into electrical signals to obtain the holographic image information.

Alternatively, in accordance with another example of the present disclosure, in another way to obtain holographic image information of a scene, the first light beam and the second light beam that is used to illuminate the scene, the second light beam is guided to the scene, and the light reflected by and exiting from the scene impinges on a holographic storage material after interfering with the first light beam to store the holographic image information therein. A third light beam is emitted to irradiate the holographic storage material and thereby an imaging beam is generated and exits from the holographic storage material. The imaging beam impinges on one image acquiring device, which converts the optical signals into electrical signals to obtain the holographic image information. Optionally, the holographic storage material may be disposed on a movable device, which can orientate different parts of the holographic storage material to the light beam to impinge thereon. For example, the movable device may be a rotatable table.

Alternatively, in accordance with another example of the present disclosure, in a third way to obtain holographic image information of a scene, optical images of a scene are pre-stored in a holographic storage material, and a fourth light beam is emitted to irradiate the holographic storage material, so that an imaging beam exiting from the holographic storage material is generated and impinges on one image acquiring device, which then generates electrical signals to get the holographic image information. Optionally, the holographic storage material may be disposed on a movable device, which can orientate different parts of the holographic storage material to the light beam to impinge thereon. For example, the movable device may be a rotatable table.

In step S602, holographic image synthesis information is generated based on at least a part of the holographic image information of at least one scene. In accordance with an example of the present disclosure, before generating the holographic image synthesis information, editing data input by a user may be received in advance and then be used to edit at least a part of the holographic image information to generate the holographic image synthesis information.

In step S603, a holographic synthetic image is reconstructed based on the holographic image synthesis information. In accordance with an example of the present disclosure, the process of reconstructing a holographic synthetic image may include emitting a reconstructing beam, receiving holographic image synthesis information, converting the holographic image synthesis information into optical signals with irradiation by the reconstructing beam and presenting the optical signals as a holographic synthetic image.

Using the image display method in the embodiment of the present disclosure, images of scenes at different locations may be synthesized into one scene image and better display effect can be achieved in comparison with to existing quasi-holographic technologies. The image display method can be widely applied in a variety of areas, such as, telemedicine, teleconference, remote live broadcast etc.

What are described above is related to the illustrative embodiments of the disclosure only and not limitative to the scope of the disclosure. Obvious variations and replacement by any one of the skilled person in the art in the technical scope of the disclosure should be all covered in the scope of this disclosure. The scopes of the disclosure are defined by the accompanying claims.

The present application claims priority of China Patent application No. 201610232300.1 filed on Apr. 14, 2016, the content of which is incorporated in its entirety as part of the present application by reference herein.

The invention claimed is:

1. An image display system, comprising:
a plurality of holographic image acquiring devices, wherein the plurality of holographic image acquiring devices are configured to respectively obtain holographic image information of a plurality of scenes, wherein holographic image information obtained by different holographic image acquiring devices of the plurality of holographic image acquiring devices are corresponding to different scenes of the plurality of scenes;
an image synthesizer configured to generate holographic image synthesis information based on the holographic image information obtained by the plurality of holographic image acquiring devices; and
an image reconstruction device configured to reconstruct a holographic synthetic image in accordance with the holographic image synthesis information.

2. The system of claim 1, wherein each of the plurality of holographic image acquiring devices comprises a light source assembly, an optical assembly, and an image acquiring device.

3. The system of claim 2, wherein
the light source assembly is configured to emit a first light beam and a second light beam, wherein the second light beam irradiates the scene and is guided to the scene by the optical assembly, light exiting from the scene impinges on the image acquiring device after interfering with the first light beam, and the image acquiring device converts interference information formed by the interfering into electrical signals to get the holographic image information and sends the holographic image information to the image synthesizer.

4. The system of claim 2, wherein the light source assembly comprises a first laser, and the optical assembly comprises a light splitting device, which splits light emitted by the first laser into a first light beam and a second light beam.

5. The system of claim 2, wherein each of the holographic image acquiring devices further comprises a holographic storage material;
the light source assembly is configured to emit a first light beam and a second light beam, wherein the second light beam irradiates the scene and is guided to the scene by the optical assembly, and light exiting from the scene impinges on the holographic storage material after interfering with the first light beam to store the holographic image information in the holographic storage material; and
the light source assembly is further configured to emit a third light beam to irradiate the holographic storage material, so that an imaging beam exiting from the holographic storage material is generated and irradiates the image acquiring device, which then generates electrical signals to get the holographic image information and sends the holographic image information to the image synthesizer.

6. The system of claim 5, wherein the light source assembly comprises a first laser, and the optical assembly comprises a light splitting device, which splits a primary light emitted by the first laser into the first light beam, the second light beam, and the third light beam.

7. The system of claim 5, wherein the light source assembly comprises a first laser and a second laser as well as a light splitting device, the light splitting device splits a primary light beam emitted from the first laser into the first light beam and the second light beam, and the second laser emits the third light beam.

8. The system of claim 5, wherein the holographic storage material comprises a photorefractive crystal, a photo-chromic material or a photopolymer.

9. The system of claim 8, wherein the holographic storage material is disposed on a movable device, which is configured to orientate different parts of the holographic storage material to the light to impinge thereon.

10. The system of claim 9, wherein the movable device is a rotatable table.

11. The system of claim 2, further comprising an editing data input device configured for inputting editing data, wherein the image synthesizer is further configured to utilize the editing data to edit the holographic image information, so that the holographic image synthesis information is generated.

12. The system of claim 2, wherein the image acquiring device comprises a CCD or CMOS imaging device.

13. The system of claim 2, wherein the image reconstruction device comprises:
a light source configured to emit a reconstructing beam;
a spatial light modulator configured to receive the holographic image synthesis information and convert it into optical signals with irradiation of the reconstructing beam; and
an imaging device configured to present the optical signals as the holographic synthetic image.

14. The system of claim 13, wherein the light source comprises a laser.

15. The system of claim 13, wherein the spatial light modulator comprises a liquid crystal light valve, a MEMS spatial light modulator, a digital micro-mirror device or an acousto-optic modulator.

16. The system of claim 1, wherein each of the plurality of holographic image acquiring devices comprises a light source assembly, an image acquiring device, and a holographic storage material having optical images of the scene stored therein; and the light source assembly emits a fourth light beam that irradiates the holographic storage material to generate an imaging beam exiting from the holographic storage material, wherein the imaging beam impinges on the image acquiring device to make it generate electrical signals so as to get and send the holographic image information to the image synthesizer.

17. The system of claim 1, wherein the holographic image acquiring devices, the image synthesizer, and the image reconstruction device are connected through networks.

18. An image display method comprising:

obtaining, respectively by a plurality of holographic image acquiring devices, holographic image information of a plurality of scenes, wherein holographic image information obtained by different holographic image acquiring devices of the plurality of holographic image acquiring devices are corresponding to different scenes of the plurality of scenes;

generating holographic image synthesis information based on the holographic image information of the plurality of scenes; and reconstructing a holographic synthetic image in accordance with the holographic image synthesis information.

19. The method of claim 18, wherein the obtaining the holographic image information of the plurality of scenes comprises:

emitting a first light beam;

emitting a second light beam that irradiates the plurality of scenes;

guiding the second light beam to the plurality of scenes, irradiating an image acquiring device with light exiting from the plurality of scenes and having the light exiting from the plurality of scenes interfere with the first light beam; and converting interference information formed by interference into electrical signals by the image acquiring device to get the holographic image information.

20. An image display device, comprising:

a plurality of holographic image acquiring devices, wherein the plurality of the holographic image acquiring devices are configured to respectively obtain holographic image information of a plurality of scenes, wherein holographic image information obtained by different holographic image acquiring devices of the plurality of holographic image acquiring devices are corresponding to different scenes of the plurality of scenes;

an image synthesizer configured to generate holographic image synthesis information based on the holographic image information obtained by the plurality of holographic image acquiring devices; and an image reconstruction device configured to reconstruct a holographic synthetic image in accordance with the holographic image synthesis information, wherein each of the plurality of holographic image acquiring devices comprises a light source assembly, an optical assembly, and an image acquiring device, the light source assembly comprises a first laser, and the optical assembly comprises a light splitting device, which splits light emitted by the first laser into a first light beam and a second light beam, the image reconstruction device comprises:

a light source configured to emit a reconstructing beam;

a spatial light modulator configured to receive the holographic image synthesis information and convert it into optical signals with irradiation of the reconstructing beam; and an imaging device configured to present the optical signals as the holographic synthetic image.

* * * * *